(12) United States Patent
Migliore

(10) Patent No.: US 10,210,770 B2
(45) Date of Patent: Feb. 19, 2019

(54) LANDSCAPE AND GARDEN STENCILS

(71) Applicant: Christine Migliore, Battle Creek, MI (US)

(72) Inventor: Christine Migliore, Battle Creek, MI (US)

( * ) Notice: Subject to any disclaimer, the term of this patent is extended or adjusted under 35 U.S.C. 154(b) by 22 days.

(21) Appl. No.: 15/038,292

(22) PCT Filed: Sep. 17, 2015

(86) PCT No.: PCT/US2015/050652
§ 371 (c)(1),
(2) Date: May 20, 2016

(87) PCT Pub. No.: WO2016/048779
PCT Pub. Date: Mar. 31, 2016

(65) Prior Publication Data
US 2017/0188522 A1    Jul. 6, 2017

Related U.S. Application Data

(60) Provisional application No. 62/053,902, filed on Sep. 23, 2014.

(51) Int. Cl.
*A01G 9/02* (2018.01)
*G09B 19/00* (2006.01)
*A01G 9/28* (2018.01)

(52) U.S. Cl.
CPC ............... *G09B 19/00* (2013.01); *A01G 9/28* (2018.02)

(58) Field of Classification Search
CPC ........ A01G 1/007; A01G 1/002; A01G 1/005; A01G 9/02; A01G 9/12; A01G 1/08; A01G 17/04; A01G 5/04; A01G 9/28
See application file for complete search history.

(56) References Cited

U.S. PATENT DOCUMENTS

| | | | | |
|---|---|---|---|---|
| 2,716,827 A | * | 9/1955 | Mixter | A01G 5/04 248/27.8 |
| 3,992,812 A | * | 11/1976 | Horowitz | A01G 9/12 47/45 |
| 5,588,253 A | * | 12/1996 | Boodley | A01G 5/04 428/3 |
| 5,860,433 A | * | 1/1999 | Halpern | A45D 40/30 132/216 |

(Continued)

*Primary Examiner* — Trinh T Nguyen
(74) *Attorney, Agent, or Firm* — Kohn & Associates PLLC

(57) ABSTRACT

A landscaping stencil including a flat body having at least one removable cut out formed in a shape for delineating an area for landscaping material. A three-dimensional landscaping stencil including a three-dimensional wall formed in a shape for delineating an area for landscaping material. Kits for landscaping. A method of landscaping by placing a landscaping stencil including a flat body having at least one removable cut out formed in a shape for delineating an area for landscaping material on top of a planting area, removing the at least one removable cut out, and filling landscaping material in the shape left by the least one removable cut out. A method of landscaping by placing a three-dimensional landscaping stencil including a three-dimensional wall formed in a shape for delineating an area for landscaping material on top of a planting area, and filling landscaping material in the shape.

21 Claims, 4 Drawing Sheets

(56) References Cited

U.S. PATENT DOCUMENTS

| | | | | |
|---|---|---|---|---|
| 6,763,601 B1 * | 7/2004 | Turley | ............... | A01G 2/00 33/566 |
| 8,033,049 B2 * | 10/2011 | St. Clair | ............ | A01G 2/00 47/65.9 |
| 8,151,516 B1 * | 4/2012 | Harshman | ........... | A01G 5/04 47/41.01 |
| 8,567,119 B2 * | 10/2013 | Kepes | ............... | A01G 5/04 47/41.01 |
| 2015/0027047 A1 * | 1/2015 | Roberts | ............. | A01G 9/02 47/66.7 |

* cited by examiner

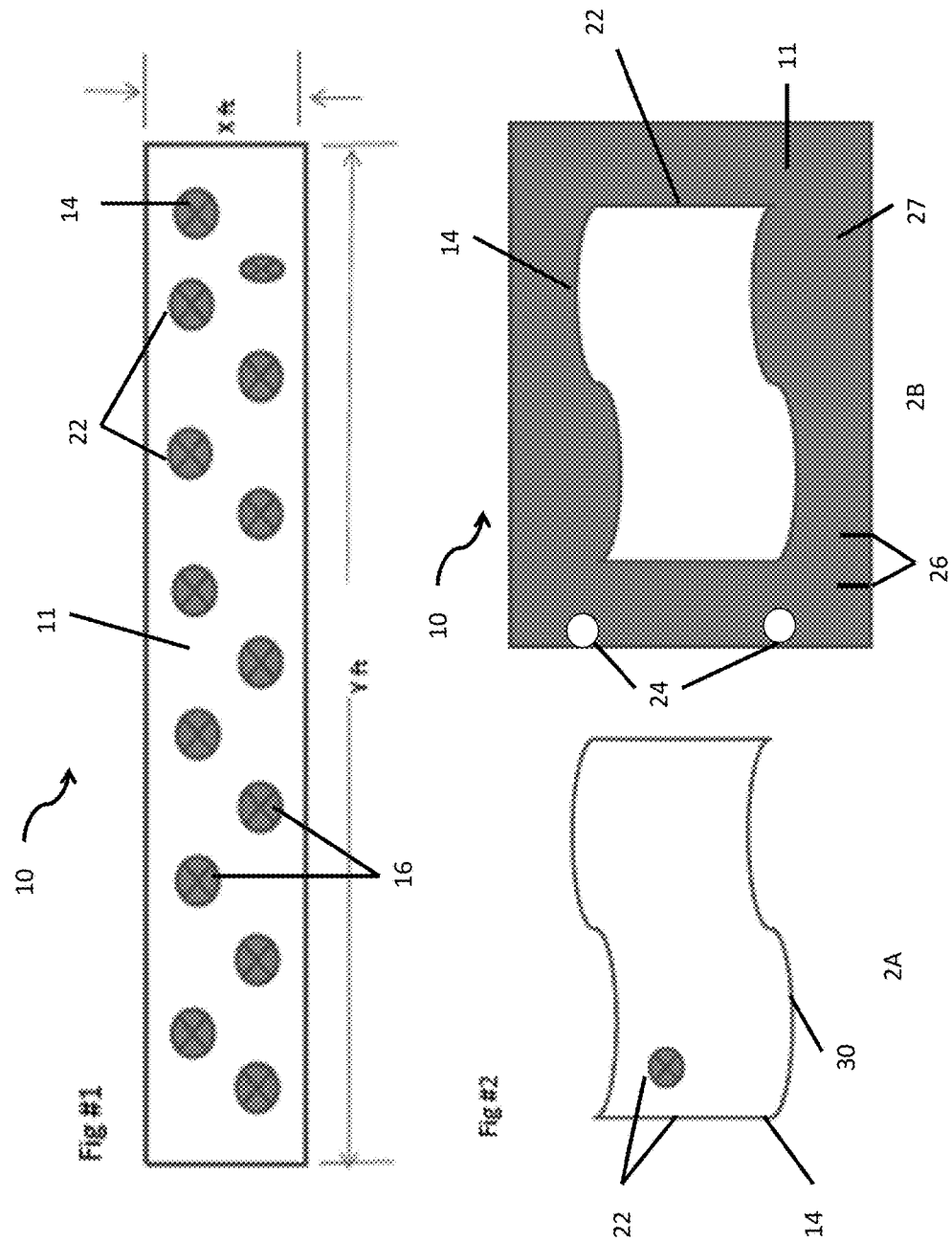

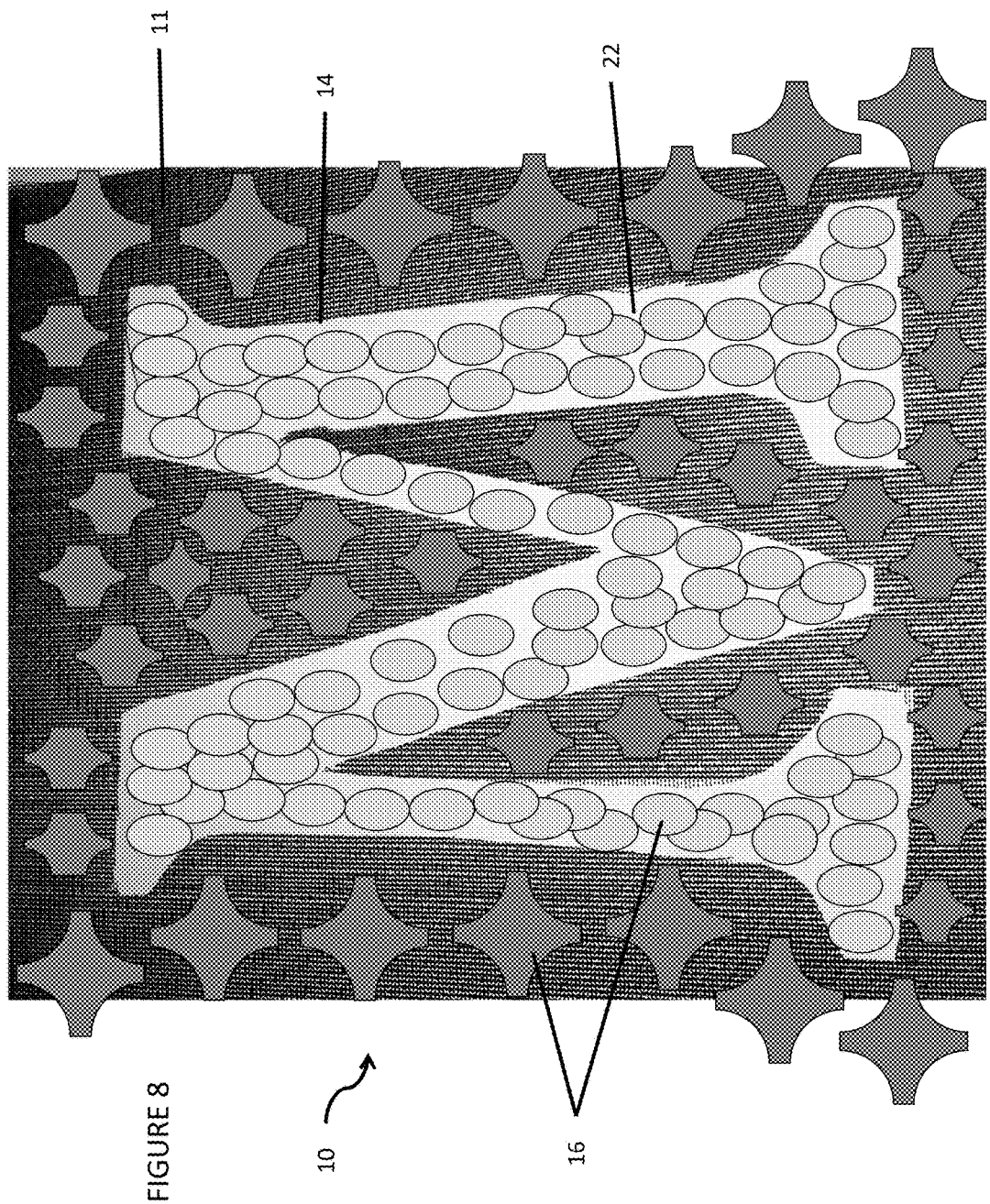

LANDSCAPE AND GARDEN STENCILS

BACKGROUND OF THE INVENTION

1. Technical Field

The present invention relates to tools for landscaping and gardening. More specifically, the present invention relates to a stencil for designing landscapes and gardens.

2. Background Art

Many people desire a garden or yard that looks neat and thoughtfully arranged. Hiring a landscaper to design and create a particular design of plants and landscaping material is one way to accomplish this; however, landscapers can be cost prohibitive to many individuals.

Tree rings, borders, frames, or edging are used by individuals to delineate space around tree trunks and are generally long strips of plastic or stone half-circles that can be placed around the trunk. Mulch or other plants can be added in right up to the trunk, leaving the lawn on the other side. There is no additional separation between the area to be planted from the tree trunk. These devices function as borders but not as planting stencils.

There is a need for an easy way to design a landscape and garden with minimal cost while still providing an aesthetic and desirable look.

SUMMARY OF THE INVENTION

The present invention provides for a landscaping stencil including a flat body having at least one removable cut out formed in a shape for delineating an area for landscaping material.

The present invention provides for a three-dimensional landscaping stencil including a three-dimensional wall formed in a shape for delineating an area for landscaping material.

The present invention also provides for a kit for landscaping, including the landscaping stencil, landscaping material, and instructions for planting.

The present invention provides for a kit for landscaping, including the three-dimensional stencil, landscaping material, and instructions for planting.

The present invention further provides for a method of landscaping by placing a landscaping stencil including a flat body having at least one removable cut out formed in a shape for delineating an area for landscaping material on top of a planting area, removing the at least one removable cut out, and filling landscaping material in the shape left by the least one removable cut out.

The present invention provides for a method of landscaping by placing a three-dimensional landscaping stencil including a three-dimensional wall formed in a shape for delineating an area for landscaping material on top of a planting area, and filling landscaping material in the shape.

DESCRIPTION OF THE DRAWINGS

Other advantages of the present invention are readily appreciated as the same becomes better understood by reference to the following detailed description when considered in connection with the accompanying drawings wherein:

FIG. 1 is a top view of a 2-dimensional landscaping stencil;

FIG. 2A is top view of a cut out and FIG. 2B is a top view of a 2-dimensional landscaping stencil;

FIG. 8 is a top view of a block letter landscape stencil with stones and annuals as landscaping material.

DETAILED DESCRIPTION OF THE INVENTION

Figure 3:
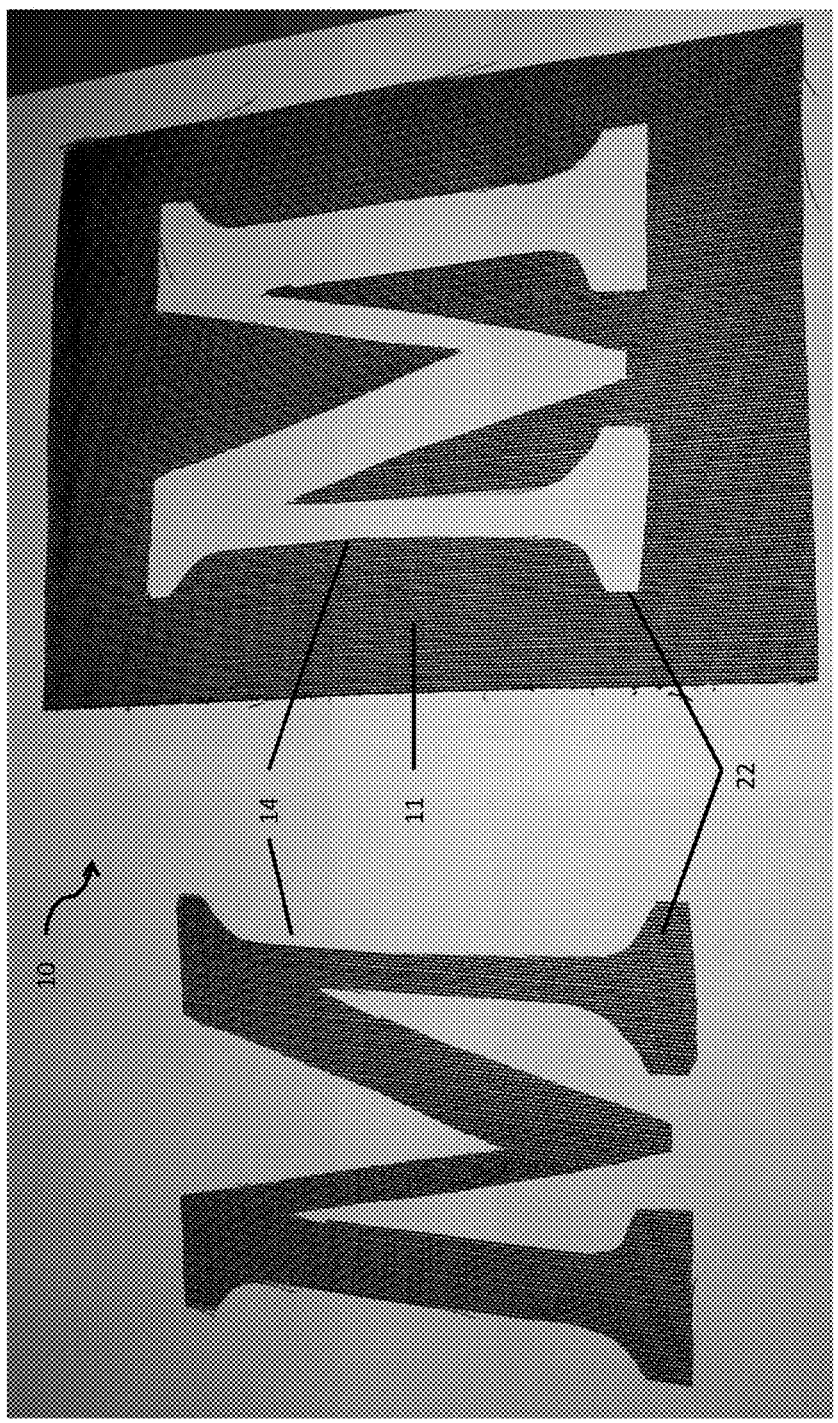
FIG. 3 is a photograph of a cut out and a 2-dimensional landscaping stencil in a block letter M.
Figure 5:
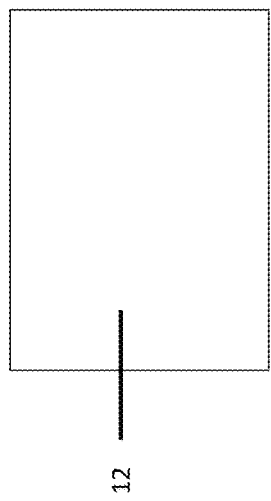
FIG. 5 is a side view of a three-dimensional landscaping stencil.

The present invention is generally directed to a landscaping stencil, shown at 10 in the FIGURES, that is used to design a landscape in a particular shape and can be filled in with various landscaping materials. The landscaping stencil 10 can easily be used by homeowners, landscaping companies, businesses to beautify their landscapes and gardens.

Throughout the application, prime numbers (') indicate like structure between embodiments.

More specifically, the landscaping stencil 10 includes a flat body 11 having at least one removable cut out 22 formed in a particular shape 14 that once removed from the landscaping stencil 10 delineates an area in that shape 14 for landscaping material 16 to be filled in, as shown in FIGS. 1 and 2B, either to be added by a user or to be released from the cut out 22 as described below. The landscaping stencil 10 can also be referred to as a form or a design.

The flat body 11 is made from a geo-textile material, such as, but not limited to, flat screen, or flat fabric. The landscaping stencil 10 is essentially a two-dimensional flat surface that is laid on top of the ground or area to be landscaped. The flat body 11 can be made in any color. The cut outs 22 can be made in the same material and in the same color as the flat body 11 or they can be in a different color to distinguish from the flat body 11.

The cut outs 22 can be removably attached to the flat body 11 by perforations or any other suitable mechanism that allow them to easily be removed from the flat body 11. The cut outs 22 can themselves be used as a landscaping stencil 10 with further cut outs 22 (i.e. at least a second cut out 22) that can be removed therefrom, as shown in FIG. 2A. The cut outs 22 can also be used themselves to do a border planting around a border 30 of the cut out 22.

The cut outs 22 can also be embedded with landscaping material 16 (preferably in seed form). The cut outs 22 can be made of material that easily releases from the flat body 11 and dissolves when watered to release the landscaping material into soil directly below the cut outs 22, such as, but not limited to, paper, cellulosic materials, or dissolvable membranes.

The landscaping stencil 10 can serve as an outline to lay edging. The landscaping stencil 10 can also include various indicators 26, such as a mark, a number, or a letter, at any suitable location on a top side 27 to aid in spacing plantings of landscaping material 16, such as spacings for vegetables, any type of seeds, annuals, perennials, or any other type of plant (shown in FIG. 2B).

Figure 4:
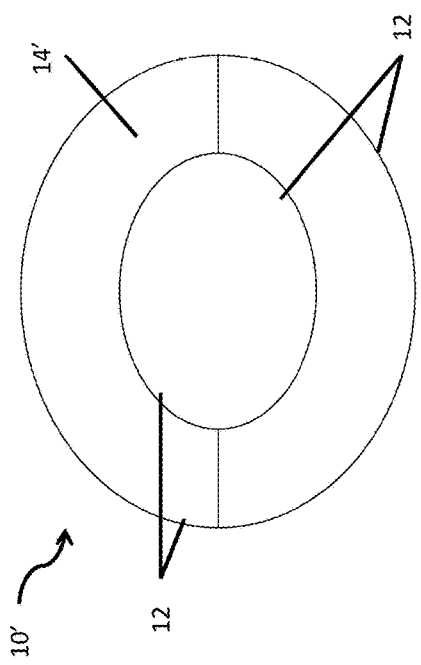
FIG. 4 is a top view of a three-dimensional landscaping stencil in the shape of a half circle.
Figure 7:
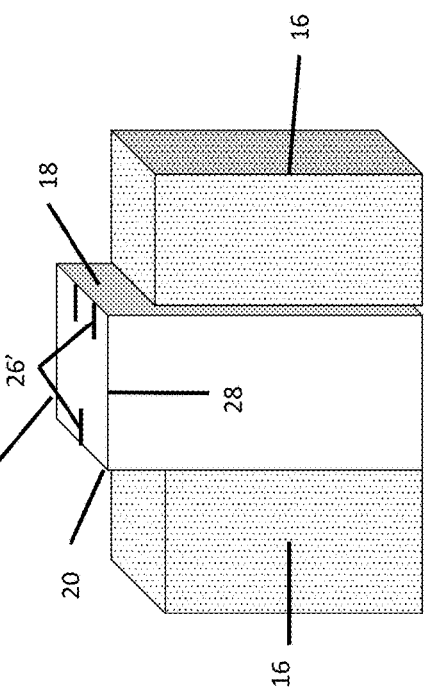
FIG. 7 is a top view of a three-dimensional landscaping stencil with landscaping material filled inside.

The shape 14 can be, but is not limited to, circle, half-circle (shown in FIGS. 4 and 7, such as for placing around a tree trunk), square, rectangle, diamond, fleur-de-lis, sport shapes (baseball, football, soccer, basketball, skateboard, tennis), graduation cap, wedding cake, heart, licensed professional or college sport logos (i.e. Detroit Lions, Red Wings, University of Michigan block M), holiday symbols, animal symbols, ornaments, flags, nationality symbols, motorcycle logos, bike logos, automobile logos, and block letters (such as for spelling out a name or using a single letter, as shown in FIGS. 3 and 8). Custom shapes 14 can also be created for restaurants, gas stations, department stores, shopping malls, schools, churches, or any other individual or organization (i.e. custom logos). Shapes 14 can also be made for around a mailbox, small floral garden, and designs around shrubs.

The shape 14 can be any desired size and can come in multiple sizes for various purposes. For example, when used for garden vegetables, the shape 14 can be a particular size for that vegetable, such as, but not limited to, tomato plants, beans, onions, and corn as well as provide the recommended space between individual plants for optimum growing conditions. The shape 14 can be circles clearly spaced and correctly sized for a specific planting of landscaping material 16, as shown in FIG. 1.

The landscaping material 16 can be, but is not limited to, flowers, leafy plants, grasses, perennials, annuals, seeds, stone, mulch, herbs, and garden vegetables. Various types of landscaping material 16 can be used in each cut out 22 and outside of the wall 12 to create different designs and colored areas.

The landscaping stencil 10 can also include fertilizing agents either directly incorporated in the material it is made from, or applied thereon after manufacture. Therefore, the landscaping stencil 10 can serve as a fertilizing agent for the planted area.

The landscaping stencil 10 can optionally be used with at least one securing mechanism 24, such as, but not limited to, a clip, a stake, or a nail, in order to secure in place while planting. The securing mechanism 24 can be placed in any suitable area on the landscaping stencil 10, and multiple securing mechanism 24 can be used, such as at each corner or outer side of the landscaping stencil 10.

Figure 6:
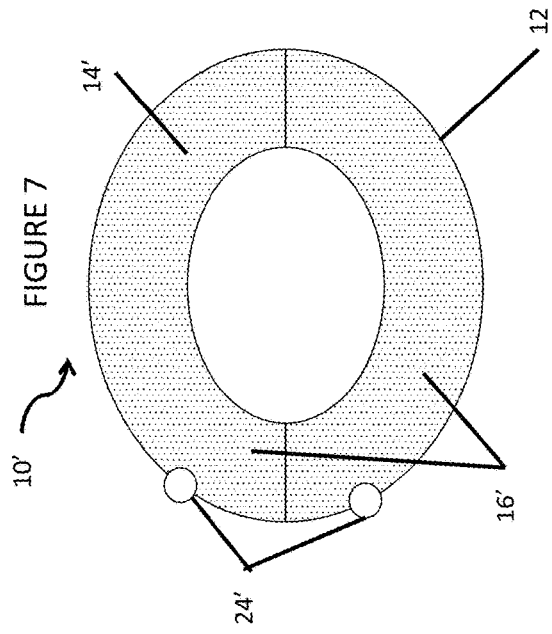
FIG. 6 is a cross-sectional view of a three-dimensional landscaping stencil with landscaping material on either side.

Alternatively, in a three-dimensional embodiment, the landscaping stencil 10' can be made from materials such as, but not limited to, plastics, wood, and stone, as shown in FIGS. 4-7. In the three-dimensional landscaping stencil 10', a three-dimensional wall 12 forms the shape 14' (any described above) for delineating an area for landscaping material. The wall 12 includes at least one inner side 18 and at least one outer side 20, depending on the shape 14' used. Preferably, the wall 12 is an enclosed shape having at least one cut out 22' in which to fill landscaping material 16' (any described above). Landscaping material 16' can be added to the cut out 22' and contacting the inner side 18 as well as outside of the wall 12 such that the landscaping material contacts the outer side 20, as shown in FIG. 6. The wall 12 can be made in any desired thickness and color. The wall 12 can serve as an outline to lay edging. The wall 12 can also include various indicators 26' on a top side 28 to aid in spacing plantings, such as spacings for vegetables, annuals, perennials, or any other type of plant, shown in FIG. 6. These indicators 26' can be along both the inner side 18 and the outer side 20, or only on one of the inner side 18 or the outer side 20 as desired.

It should further be understood that the landscaping stencil 10, 10' is not limited to planting, but can be used for a range of applications, including making designs in cement for driveways, patios, and sidewalks. In such an application, the landscaping stencil 10, 10' is preferably made of wood.

The present invention also provides for a kit for landscaping, including the landscaping stencil 10, 10', landscaping material 16, and instructions for planting. Securing mechanisms 24 and any fertilizer necessary can also be included.

In a method of landscaping, the landscaping stencil 10, 10' is laid or placed on top of the planting area on the ground (preferably soil). The cut out(s) 22 are removed from the flat body 11 in the 2-dimensional embodiment, either before or after positioning on the ground (soil). Landscaping material 16 is filled in the shape 14 left by the cut out(s) 22. The cut out(s) 22 can be subsequently used by filling additional cut out(s) 22 therein with landscaping material 16 or alternatively used in making a border with landscaping material 16 planted or filled around the border 30. When the cut out(s) 22 contain landscaping material 16 embedded therein (i.e. seeds), the flat body 11 is laid over the ground (soil), the removing step is accomplished by watering the flat body 11 and the filling step is accomplished by the cut out(s) dissolving and releasing the seed therein to the soil. Edging can be laid around the landscaping stencil 10, 10' by filling landscaping material 16 according to at least one indicator 26, 26'. The landscaping stencil 10 can remain on the ground and can serve as a weed blocker and can stand up to weather conditions and watering. Alternatively, the landscaping stencil 10 can be removed after filling the shapes 14 with landscaping material 16.

In the three-dimensional embodiment, the landscaping material 16 is filled in the shape 14' (and preferably in cut out(s) 22) to contact with the inner side 18. Optionally, landscaping material 16 can be filled outside of the landscaping stencil 10, 10' (and up to and contacting the outer side 20 of the wall 12 in the three-dimensional embodiment). The landscaping stencil 10, 10' can be left in the planting area to serve as a weed barrier around the plantings, or it can be lifted up and reused in an additional planting area multiple times. The plantings remain delineated after the landscaping stencil 10, 10' has been removed.

The landscaping stencil 10, 10' is advantageous for homeowners who desire a clearly delineated design in their landscape or garden but cannot afford a landscaping company to plant it for them. The landscaping stencil 10, 10' is also advantageous for landscaping companies because all they have to do is lay down the landscaping stencil 10, 10' and bring in the landscaping material of their customers' choice.

The invention is further described in detail by reference to the following experimental examples. These examples are provided for the purpose of illustration only, and are not intended to be limiting unless otherwise specified. Thus, the invention should in no way be construed as being limited to the following examples, but rather, should be construed to encompass any and all variations which become evident as a result of the teaching provided herein.

EXAMPLE 1

A landscaping stencil 10 in the shape 14 of a block letter (an "M") can be laid in a planting area, landscaping material 16 of stone can be placed inside the cut out 22 and annuals can be placed along the border 30, as shown in FIG. 8. The letter "M" can be produced with areas scored 4-6" apart so the user knows exactly where to place the plant whether they are planting annuals, perennials, or plants. The spacing can change with different seasonal plants. The landscaping stencil 10 can be produced for the user who prefers to plant with bigger spacing between the plant but still keeping the "M" design intact.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A landscaping stencil comprising a flat body including at least one removable cut out formed in a shape for delineating an area for landscaping material, wherein said at least one removable cut out is embedded with landscaping material and is dissolvable with water.

2. The landscaping stencil of claim 1, wherein said flat body is made of a geo-textile material chosen from the group consisting of flat screen and flat fabric.

3. The landscaping stencil of claim 1, wherein said at least one removable cut out includes at least a second removable cut out.

4. The landscaping stencil of claim 1, wherein said landscaping material is seed.

5. The landscaping stencil of claim 1, further including indicators to aid in spacing landscaping material.

6. The landscaping stencil of claim 1, wherein said shape is chosen from the group consisting of circle, half-circle, square, rectangle, diamond, fleur-de-lis, sport shapes, graduation cap, wedding cake, heart, licensed professional sports logos, licensed college sport logos, holiday symbols, animal symbols, ornaments, flags, nationality symbols, motorcycle logos, bike logos, automobile logos, and block letters.

7. The landscaping stencil of claim 1, wherein said shape is sized and spaced for said landscaping material.

8. The landscaping stencil of claim 1, further including landscaping material placed within said at least one removable cutout chosen from the group consisting of flowers, leafy plants, grasses, perennials, annuals, seeds, stone, mulch, herbs, and garden vegetables.

9. The landscaping stencil of claim 1, further including fertilizing agents incorporated therein.

10. The landscaping stencil of claim 1, further including at least one securing mechanism chosen from the group consisting of a clip, a stake, and a nail.

11. A kit for landscaping, including the landscaping stencil of claim 1, landscaping material, and instructions for planting.

12. A method of landscaping, including the steps of:
 placing a landscaping stencil comprising a flat body including at least one removable cut out formed in a shape for delineating an area for landscaping material on top of a planting area;
 removing the at least one removable cut out;
 filling landscaping material in the shape left by the least one removable cut out; and
 filling landscaping material around a border of the at least one removable cut out.

13. The method of claim 12, further including the step of placing the at least one removable cut out on top of a planting area, removing at least a second cut out from said least one removable cut out, and filling landscaping material in the shape left by the second cut out.

14. The method of claim 12, wherein the at least one removable cut out includes seed embedded therein, said removing step is further defined as watering the flat body and said filling step is further defined as dissolving the at least one removable cut out and releasing the seed into the planting area.

15. The method of claim 12, further including the step of laying edging along the landscaping stencil by filling landscaping material according to at least one indicator.

16. The method of claim 12, wherein the landscaping material is chosen from the group consisting of flowers, leafy plants, grasses, perennials, annuals, seeds, stone, mulch, herbs, and garden vegetables.

17. A method of landscaping, including the steps of:
 placing a landscaping stencil comprising a flat body including at least one removable cut out formed in a shape for delineating an area for landscaping material on top of a planting area;
 removing the at least one removable cut out; and
 filling landscaping material in the shape left by the least one removable cut out;
 wherein the at least one removable cut out includes seed embedded therein, said removing step is further defined as watering the flat body and said filling step is further defined as dissolving the at least one removable cut out and releasing the seed into the planting area.

18. The method of claim 17, further including the step of placing the at least one removable cut out on top of a planting area, removing at least a second cut out from said least one removable cut out, and filling landscaping material in the shape left by the second cut out.

19. The method of claim 17, further including the step of placing the at least one removable cut out on top of a planting area, and filling landscaping material around a border of the at least one removable cut out.

20. The method of claim 17, further including the step of laying edging along the landscaping stencil by filling landscaping material according to at least one indicator.

21. The method of claim 17, wherein the landscaping material is chosen from the group consisting of flowers, leafy plants, grasses, perennials, annuals, seeds, stone, mulch, herbs, and garden vegetables.

* * * * *